United States Patent
Pelton et al.

(10) Patent No.: US 9,342,322 B2
(45) Date of Patent: May 17, 2016

(54) SYSTEM AND METHOD FOR LAYERING USING TILE-BASED RENDERERS

(75) Inventors: Blake D. Pelton, Redmond, WA (US); Amar Patel, Kirkland, WA (US); Steve Pronovost, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 815 days.

(21) Appl. No.: 13/230,436

(22) Filed: Sep. 12, 2011

(65) Prior Publication Data
US 2013/0063473 A1    Mar. 14, 2013

(51) Int. Cl.
*G06F 9/44* (2006.01)
*G06T 11/40* (2006.01)
*G09G 5/36* (2006.01)
*G06F 17/00* (2006.01)
*G06T 1/00* (2006.01)
*G06T 15/00* (2011.01)

(52) U.S. Cl.
CPC .............. *G06F 9/4443* (2013.01); *G06T 11/40* (2013.01); *G06T 15/005* (2013.01); *G06F 9/44* (2013.01); *G06F 17/00* (2013.01); *G06T 1/00* (2013.01); *G06T 15/00* (2013.01); *G09G 5/36* (2013.01); *G09G 5/363* (2013.01); *G09G 2360/122* (2013.01)

(58) Field of Classification Search
None
See application file for complete search history.

(56) References Cited

U.S. PATENT DOCUMENTS

| | | |
|---|---|---|
| 5,297,032 A | 3/1994 | Trojan et al. |
| 5,321,750 A | 6/1994 | Nadan |
| 5,339,392 A | 8/1994 | Risberg et al. |
| 5,481,669 A | 1/1996 | Poulton et al. |
| 5,581,670 A | 12/1996 | Bier et al. |
| 5,617,114 A | 4/1997 | Bier et al. |
| 5,819,284 A | 10/1998 | Farber et al. |
| 5,867,166 A | 2/1999 | Myhrvold et al. |

(Continued)

FOREIGN PATENT DOCUMENTS

| | | |
|---|---|---|
| CN | 1825353 A | 8/2006 |
| KR | 10-2011-0042872 A | 4/2011 |
| WO | WO 99/26127 A1 | 5/1999 |

OTHER PUBLICATIONS

M Meiβner, "Occlusion Culling and Hardware Accelerated Volume Rendering," 2000, 155 pages http://deposit.ddb.de/cgibin/dokserv?idn=963198289&dok_var=d1&dok_ext=pdf &filename=963198289.pdf.

(Continued)

*Primary Examiner* — Jwalant Amin
(74) *Attorney, Agent, or Firm* — Sunah Lee; Judy Yee; Micky Minhas

(57) ABSTRACT

A method for tile-based rendering of content. Content may be rendered in a memory region organized as multiple tiles. In scenarios in which content is generated in layers, for operations that involve compositing image layers, an order in which portions of the image are processed may be selected to reduce the aggregate number of memory accesses times, which in turn may improve the performance of a computer that uses tile-based rendering. An image may be processed such that operations relating to rendering portions of different layers corresponding to the same tile are performed sequentially. Such processing may be used in a computer with a graphics processing unit that supports tile-based rendering, and may be particularly well suited for computers with a slate form factor. An interface to a graphics processing utility within the computer may provide a flag to allow an application to specify whether operations may be reordered.

25 Claims, 5 Drawing Sheets

(56) References Cited

U.S. PATENT DOCUMENTS

| | | | |
|---|---|---|---|
| 5,870,098 A | 2/1999 | Gardiner | |
| 5,883,627 A | 3/1999 | Pleyer | |
| 5,959,621 A | 9/1999 | Nawaz et al. | |
| 6,031,529 A | 2/2000 | Migos et al. | |
| 6,177,945 B1 | 1/2001 | Pleyer | |
| 6,188,405 B1 | 2/2001 | Czerwinski et al. | |
| 6,216,141 B1 | 4/2001 | Straub et al. | |
| 6,278,448 B1 | 8/2001 | Brown et al. | |
| 6,311,058 B1 | 10/2001 | Wecker et al. | |
| 6,369,830 B1 | 4/2002 | Brunner et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,570,578 B1 | 5/2003 | Smirnov et al. | |
| 6,601,057 B1 | 7/2003 | Underwood et al. | |
| 6,639,594 B2 | 10/2003 | Zhang et al. | |
| 6,657,635 B1* | 12/2003 | Hutchins et al. | 345/543 |
| 6,717,584 B2 | 4/2004 | Kulczycka | |
| 6,724,403 B1 | 4/2004 | Santoro et al. | |
| 6,734,873 B1 | 5/2004 | Herf et al. | |
| 6,819,321 B1 | 11/2004 | Hsieh et al. | |
| 6,832,355 B1 | 12/2004 | Duperrouzel et al. | |
| 6,919,891 B2 | 7/2005 | Schneider et al. | |
| 6,976,210 B1 | 12/2005 | Silva et al. | |
| 7,028,264 B2 | 4/2006 | Santoro et al. | |
| 7,071,937 B1 | 7/2006 | Collodi | |
| 7,106,343 B1 | 9/2006 | Hickman | |
| 7,167,181 B2 | 1/2007 | Duluk, Jr. et al. | |
| 7,170,513 B1 | 1/2007 | Voorhies et al. | |
| 7,170,515 B1 | 1/2007 | Zhu | |
| 7,376,907 B2 | 5/2008 | Santoro et al. | |
| 7,403,209 B2 | 7/2008 | Liao et al. | |
| 7,474,313 B1* | 1/2009 | Bittel | G09G 5/397 345/422 |
| 7,474,314 B2 | 1/2009 | Minchew et al. | |
| 7,535,480 B2 | 5/2009 | Hartman et al. | |
| 7,933,632 B2 | 4/2011 | Flynt et al. | |
| 7,987,431 B2 | 7/2011 | Santoro et al. | |
| 9,043,712 B2* | 5/2015 | Santoro | G06F 3/0481 715/716 |
| 2003/0085904 A1 | 5/2003 | Kulczycka | |
| 2003/0132937 A1 | 7/2003 | Schneider et al. | |
| 2003/0197716 A1 | 10/2003 | Krueger | |
| 2004/0015610 A1 | 1/2004 | Treadwell | |
| 2004/0039934 A1 | 2/2004 | Land et al. | |
| 2004/0075699 A1 | 4/2004 | Franchi et al. | |
| 2005/0060759 A1 | 3/2005 | Rowe et al. | |
| 2005/0132305 A1 | 6/2005 | Guichard et al. | |
| 2005/0243086 A1 | 11/2005 | Schechter et al. | |
| 2006/0066925 A1 | 3/2006 | Hasegawa et al. | |
| 2006/0170693 A1* | 8/2006 | Bethune et al. | 345/568 |
| 2006/0190833 A1 | 8/2006 | SanGiovanni et al. | |
| 2007/0040851 A1 | 2/2007 | Brunner et al. | |
| 2008/0030504 A1 | 2/2008 | Brunner et al. | |
| 2008/0170066 A1 | 7/2008 | Falchetto | |
| 2010/0164965 A1 | 7/2010 | Barone et al. | |
| 2010/0315423 A1* | 12/2010 | Ahn et al. | 345/426 |
| 2011/0090220 A1 | 4/2011 | Molnar et al. | |
| 2011/0225547 A1 | 9/2011 | Fong et al. | |
| 2012/0206455 A1* | 8/2012 | Shreiner | G06T 15/005 345/420 |

OTHER PUBLICATIONS

"Optimizing 3D Applications for Platforms Based on Intel Atom Processor," Mar. 2010, 28 pages http://download.intel.com/embedded/processor/whitepaper/323644.pdf.

"International Search Report", Mailed Date: Feb. 25, 2013, Application No. PCT/US2012/054386, Filed Date: Sep. 10, 2012, pp. 10.

Adobe Photoshop 7.0: Classroom in a Book; Adobe Systems, Inc.; ISBN 0-321-11562-7; 2002; 23 pages.

Kirupa.com; "Changing Colors Using ActionScript;" Feb. 21, 2003; 5 pages.

Final Office Action dated Mar. 31, 2008 in U.S. Appl. No. 11/211,871, 9 pages.

Non-Final Office Action dated Oct. 6, 2008 in U.S. Appl. No. 11/211,871, 19 pages.

Non-Final Office Action dated Sep. 20, 2007 in U.S. Appl. No. 11/211,871, 11 pages.

Notice of Allowance dated Feb. 26, 2009 in U.S. Appl. No. 11/211,871, 11 pages.

"Supplementary Search Report Issued in European Patent Application No. 12832434.0", Mailed Date: Mar. 17, 2015, 9 Pages.

"Office Action and Search Report Issued in Chinese Patent Application No. 201210335776.X", Mailed Date: Feb. 13, 2015, 11 Pages.

"Second Office Action Issued in Chinese Patent Application No. 201210335776.X", Mailed Date: Oct. 26, 2015, 8 Pages.

\* cited by examiner

SYSTEM AND METHOD FOR LAYERING USING TILE-BASED RENDERERS

BACKGROUND

A computing device may display content, such as images and/or text, on a video display to one or more human users. To this end, the computing device may perform a rendering process for calculating pixel values from the content—the pixel values, which may be organized in a memory region called an image plane, may be used by the video display to display the content.

Content to be displayed may comprise various elements, termed "primitives." Examples of primitives include line segments, curves, glyphs, windows, buttons, and/or shapes such as circles and polygons. As such, rendering may be implemented on a "pixel-by-pixel" or on a "primitive-by-primitive" basis. Pixel-by-pixel rendering may involve iterating over image plane pixels and determining each of their values in turn. On the other hand, primitive-by-primitive rendering may involve iterating over primitives in the content to be displayed and, for each such primitive, determining which image plane pixel values may be affected by the primitive, and modifying those pixel values accordingly.

Some computing devices may have specialized hardware, such as video cards and/or graphics processing units, which may be used to perform one or more types of operations as part of a rendering process. For example, a graphics processing unit (GPU) may be used to calculate one or more image plane pixel values. These computing devices may provide software applications, which may generate content to display, access to such specialized hardware, for example, through a suitable application programming interface (e.g., a graphics library, a hardware driver, etc.).

Some GPUs support tile-based rendering. Such GPUs may have a fast on-chip memory smaller than the memory used for storing the rendered content (i.e., the image plane), and this on-chip memory may be used to perform certain GPU operations more quickly. Accordingly, in tile-based rendering, content may be rendered in portions, referred to as tiles, such that the GPU may perform operations on each such portion by using the fast memory as part of the rendering process. The content may be rendered one tile at a time, with pixel values being calculated on a per-tile basis. The memory region storing pixel values may be organized as multiple tiles. Accordingly, herein, each sub-region in which pixel values associated to a tile are stored is also referred to as a tile.

Some content may comprise one or more content layers. Each content layer may comprise one or more primitives and/or may comprise any other suitable content. In rendering the content layers, the information in each layer may be combined such that the rendered information represents a composite of the information in multiple layers. Content layers may be combined in different ways to achieve different effects. For example, one or more layers may be presented as if partially transparent such that portions of an underlying layer appear through an upper layer. As another example, the layers may be clipped such that what appears on the display are portions of one layer combined with portions of another layer. Content comprising multiple content layers may be rendered one layer at a time and within each layer one primitive at a time, using multiple passes over image plane pixel values.

SUMMARY

Improved content rendering techniques may improve utilization of resources, such as power and memory, in a computing device containing specialized graphics hardware. Techniques include more efficient tile-based rendering of content comprising multiple content layers by optimizing the order in which operations in the rendering process may be performed. Specialized hardware for content rendering, such as a GPU, may be configured to render more than one content layer corresponding to a tile before performing rendering of content corresponding to other tiles. As a result, the number of times pixel values associated with that single tile are brought into memory may be reduced. This may make the overall rendering process more efficient than a conventional approach of rendering the content one content layer at a time, each content layer organized as multiple tiles, which leads to cache thrashing and poor overall performance. A more efficient rendering process may lead to reduced or improved utilization of resources, such as power and memory, which may be beneficial for computing devices (e.g., laptops, mobile phones, devices having a slate form factor, other battery-powered devices, etc.) where such resources are limited.

Accordingly, in some embodiments, a method for tile-based rendering of content comprising a plurality of layers, wherein the content is organized as a plurality of tiles including at least a first tile and a second tile, is provided. The method may comprise rendering at least a first portion of the content corresponding to the first tile by using at least one processor to calculate one or more pixel values; and in response to the rendering, performing at least one operation, before rendering content corresponding to any other tile, wherein the at least one operation comprises operations for compositing at least two of the plurality of layers.

For example, in some embodiments, the content may be rendered one tile at a time so that pixel values calculated as part of the rendering process are calculated in groups corresponding to each tile. In addition, calculating pixel values in a group corresponding to a tile may comprise calculating pixel values from multiple content layers. Accordingly, in some embodiments, content may be rendered one tile at a time rather than one layer at a time so that multiple content layers corresponding to a particular may be rendered and composited before any content corresponding to any other tile is rendered.

In some embodiments, at east one computer-readable storage medium is provided. The at least one computer-readable storage medium may store an application comprising processor-executable instructions that, when executed by at least one processor, perform a method for configuring a graphics processing unit (GPU) to render content organized as a plurality of tiles including a first tile and a second tile. The method may comprise determining which of the following acts to perform first: performing at least one operation on one or more pixel values obtained by rendering content corresponding to the first tile, or rendering at least a portion of the content corresponding to the second tile; and if it is determined that the at least one operation is to be performed first: notifying the GPU to perform, first, the at least one operation and to perform, second, the rendering.

In some embodiments, a system for rendering content comprising a plurality of content layers, wherein the content is organized as a plurality of tiles including a first tile and a second tile, is provided. The system may comprise a memory communicatively coupled to a graphics processing unit (GPU); and the GPU, wherein the GPU is configured to render at least a first portion of the content corresponding to the first tile to calculate one or more pixel values; receive an indication of which of the following acts to perform first: performing at least one operation on one or more pixel values, wherein the at least one operation comprises operations for compositing at least two of the plurality of layers, or rendering at least a second portion of the content corresponding to the second tile; and if the indication indicates that the at least one operation is to be performed first, the GPU is configured to perform the at least one operation on the one or more pixel values the first tile, and render the second portion of the content corresponding to the second tile, after performing the at least one operation.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
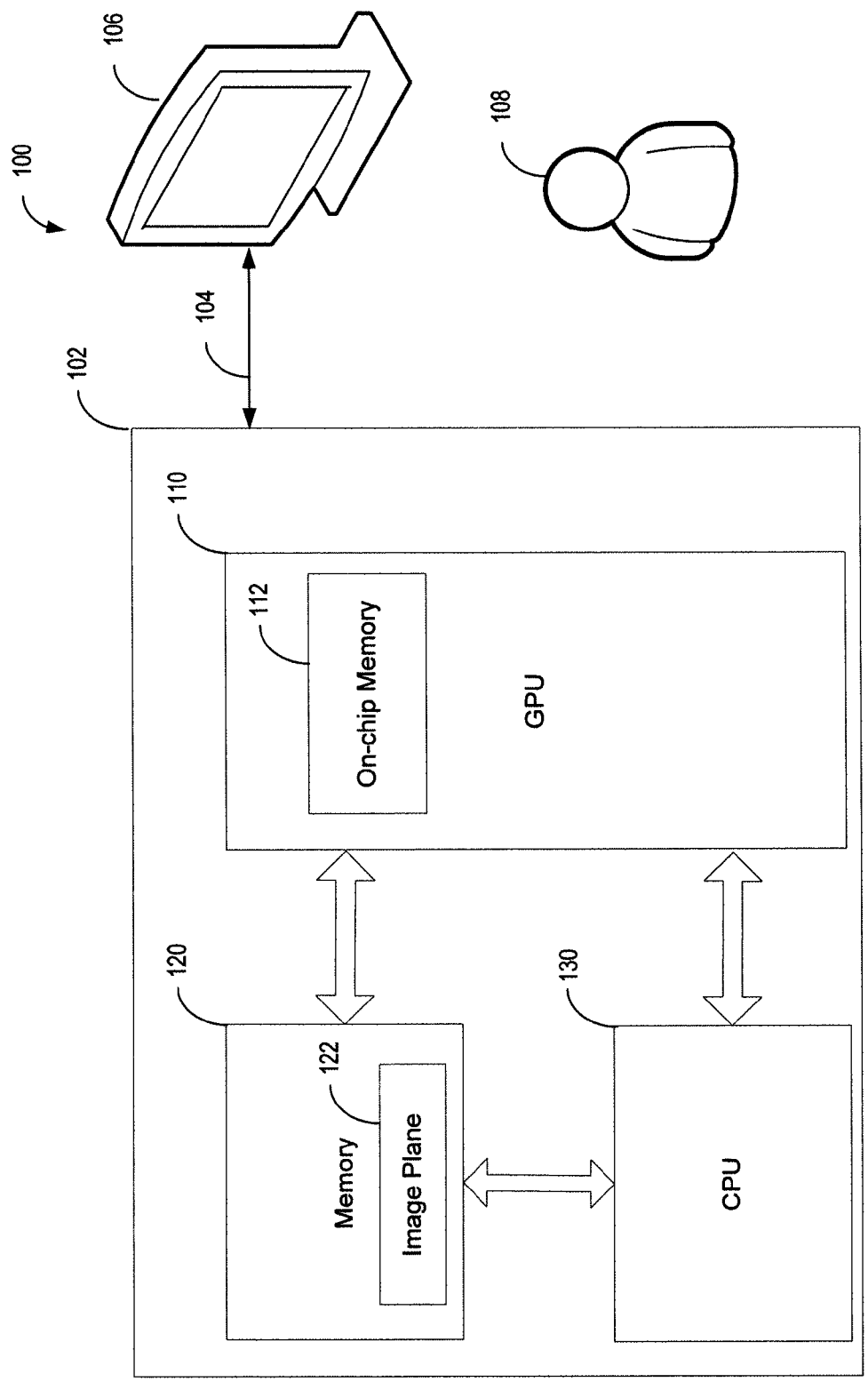
FIG. 1 shows an exemplary computing environment for rendering content, in accordance with some embodiments of the present disclosure.

The inventors have recognized and appreciated that greater utility can be derived from a GPU that supports tile-based rendering if the GPU may be configured to perform, more efficiently, tile-based rendering of content that comprises one or more content layers. In particular, the inventors have recognized that it may be advantageous to render such content one tile at a time, rather than render the content one layer at a time. In the former "layer-then-tile" approach, the content may be rendered one content layer at a time, and each such content layer may be rendered, one tile at a time. On the other hand, in the latter "tile-then-layer" approach, the content may be rendered one tile at a time—calculating pixel values associated with each tile may comprise calculating pixel values from multiple content layers.

The inventors have recognized that tile-based rendering is likely to become more prevalent because devices that can benefit from tile-based rendering are becoming more widespread. Tile-based rendering may be advantageous for use in mobile devices because it may require less memory bandwidth and less power than conventional non-tile-based rendering techniques. Mobile devices (e.g., smart phones, PDAs, tablets, etc.) are becoming more widespread, and these mobile devices include graphics processing units that support tile-based rendering.

The inventors have also recognized that even though tile-based rendering techniques may be more efficient than other types of rendering techniques, conventional techniques of using tile-based rendering on GPUs, which support tile-based rendering, can be further improved. The inventors have appreciated that improving the way in which a GPU may be configured to perform tile-based rendering may lead to more efficient rendering, which, in turn, may lead to additional benefits (e.g., extending battery life) for a mobile device containing such a GPU. In particular, the inventors have recognized that conventional techniques for tile-based rendering of content comprising multiple content layers may be improved.

One conventional approach to tile-based rendering of content, which comprises multiple content layers, is the aforementioned "layer-then-tile" approach. In this approach, content layers may be rendered one content layer at a time, one after the other. Furthermore, each content layer may be rendered one tile at a time. Accordingly, in this approach, after a portion of a content layer corresponding to a particular tile is rendered, the un-rendered portion of the content layer corresponding to the remaining tiles is rendered before any portion of another content layer corresponding to that particular tile may be rendered. This is sometimes referred to as a "mid-scene flush" because it may force all rendering operations (thereby flushing these operations from the "pipeline" of rendering operations) associated with rendering the content layer before any operations associated with rendering another layer may be performed.

Operations associated with rendering another layer may be any suitable type of operations. As one example, the operations may comprise performing one or more calculations using already-computed pixel values. Such operations may be used in numerous situations and, for example, may be used when compositing information of already-rendered layers and the other layer. As a specific example, such operations may be used to apply one or more effects, such as a transparency or a clipping effect, to the rendered content.

As a specific non-limiting example of a mid-scene flush, consider the sequence of events that may occur in tile-based rendering of two content layers. The sequence of events may comprise rendering a portion of the first content layer corresponding to tile A and copying the obtained pixel values from a fast memory used for the rendering (e.g., the GPU cache) to another memory, rendering another portion of the first content layer corresponding to tile B, then copying the obtained pixels from the fast memory to the other memory, and so on, until the entire first content layer is rendered. After the entire first content layer is rendered, a portion of the second content layer corresponding to tile A may be rendered. At this point it may be desired to composite portions of the first and second content layers to achieve a visualization effect such as transparency or clipping. However, to composite the portions of the first and second content layers corresponding to tile A, pixel values previously copied from the fast memory to another memory need to be brought back to the fast memory.

The inventors have recognized that, in the conventional "layer-then-tile" approach, performing a mid-scene flush (e.g., as in the above-described example) may result in pixel values associated with a particular tile being brought into the GPU cache multiple times. For instance, the pixel values may be brought into the GPU cache every time another content layer is being rendered (as the case may be in the above-described example), so that new pixel values may be computed as a function of values obtained from multiple content layers (e.g., when multiple content layers are being composited).

The inventors have also recognized that the size of the GPU cache may be limited and pixel values associated with content corresponding to one tile may be removed from, or overwritten in, the cache prior to pixel values associated with content corresponding to another tile being brought into the cache. As a result, in the "layer-then-tile" approach, pixel values associated with content corresponding to a particular tile may be brought in and out of the cache multiple times as the content is being rendered—a phenomenon termed "cache thrashing." Cache thrashing is inefficient because repeatedly reading values into a cache from another, typically slower, memory and/or repeatedly writing values into the other memory from the cache may incur delays.

The inventors have also recognized and appreciated that rendering content one tile at a time and, for each tile, performing calculations based on values associated with multiple content layers may overcome some of the above-mentioned drawbacks of conventional techniques for tile-based rendering. However, not every embodiment addresses every one of these drawbacks, and some embodiments may not address any of them. As such, it should be appreciated that the invention is not limited to addressing all or any of the above-discussed drawbacks of these conventional techniques for tile-based rendering.

Accordingly, in some embodiments, the aforementioned "tile-then-layer" approach to rendering may be performed. In such embodiments, at least a portion of a layer of content corresponding to a tile may be rendered and at least another portion of another content layer corresponding to the same tile may be rendered, both acts occurring prior to any content corresponding to another tile being rendered. Rendering content corresponding to a tile may comprise rendering a portion of the content by using a fast memory onboard the GPU. Rendering the other layer of content corresponding to the tile may comprise performing an operation on the already-rendered pixel values. The operation may be any suitable operation and may be performed as part of applying an effect to the content being rendered. In some embodiments, performing an operation on pixel values associated with the tile may comprise performing the operation on values stored in fast memory onboard the GPU (e.g., GPU cache).

In this "tile-then-layer" approach, the sequence of events in the above-described example for rendering content comprising two layers may comprise rendering a portion of the first content layer corresponding to tile A to obtain one or more pixel values, copying the calculated pixel values to another memory, then rendering a portion of the second layer corresponding to tile A, and, finally, compositing the previously-copied pixel values with the values obtained from rendering the portion of the second layer to blend content from the two content layers. In this example, cache thrashing may be avoided because all operations with respect to pixel values associated with content corresponding to tile A may be done together.

Accordingly, in some embodiments, processing of content comprising multiple content layers may entail determining an order in which operations for rendering the content may be processed. For example, after a portion of a content layer corresponding to a first tile is rendered there may be a choice as to whether to perform any operations on pixel values associated with the first tile (e.g., to render more content corresponding to the first tile, composite the already-rendered portion of the layer with another layer, etc.) or render another portion of content corresponding to a different tile. A different determination may be made when a "layer-then-tile" approach is employed than when a "tile-then-layer" approach is employed. In the latter case, operations on pixel values associated with content corresponding to the first tile may be performed before any content corresponding to other tiles may be rendered.

In some embodiments, a GPU may receive an indication indicating whether to render content comprising multiple layers using the "tile-then-layer" approach or the conventional "layer-then-tile" approach. As described in greater detail below, such an indication may be received as a result of a determination made by software that generates content to render and, in some instances, such an indication may comprise a parameter that was set by the software and/or a function call that was made by the software. As a specific example, a component rendering content may be configured to provide such an indication in connection with a rendering operation that involves compositing of multiple layers in scenarios in which each tile of the rendering operation depends only on content of corresponding tiles in the layers to be composited.

Any suitable computing environment may be used to implement embodiments of the present invention. One such computing environment is illustrated in FIG. 1, which shows an exemplary computing environment 100 for rendering content.

Computing environment 100 includes a computing device 102 communicatively coupled to display 106. Computing device 102 may be configured to render content such that the rendered content may be displayed on display 106. In this illustrative example, a user (e.g., user 108) may view the rendered content on display 106. Though, it should be recognized that any suitable number of users may view the rendered content as the number of users viewing the rendered content is not a limitation of the present invention.

Computing device 102 may be configured to render content in any suitable way and using any suitable technique. In some embodiments, computing device 102 may be configured to render content using tile-based rendering. Still in other embodiments, computing device 102 may be configured to render some content using tile-based rendering, but render other content without using tile-based rendering.

Computing device 102 may be configured to render any suitable content. Content may comprise any suitable type of content that may be visually presented. For example, content may comprise any suitable type of image data (e.g., images, photographs, computer-generated images, clip-art, etc.). As another example, content may comprise any suitable type of text data.

In some embodiments, the content may comprise one or more primitives. A primitive may be any suitable element within the content. For example, a primitive may be any suitable 2D or 3D shape and, for example, may be a point, a plane, line segment a curve, a spline curve, a polygon, a circle, an ellipse, a sphere, a cube, a box, a toroid, a cylinder, a pyramid, etc. As another example a primitive may be a window, a frame, a button, a field, etc. Though, it should be recognized the above examples of primitives are only illustrative and content may comprise any other suitable primitives, as known in the art.

The primitives may be represented as multiple layers that are composited to make a rendered image. Though, it should be appreciated that tile-then-layer techniques may be applied to graphics information to be rendered regardless of how it is represented.

Computing device 102 may be configured to render content in connection with any suitable purpose. In some embodiments, computing device 102 may be configured to render content for one or more software components executing, at least in part, on computing device 102. The software components may comprise any suitable software and, for example, may comprise one or more operating systems and/or one or more software applications. A software application may be any suitable application that may desire to render content to a user and, for example, may be any application comprising a text and/or a graphical user interface. Specific examples of such applications include video gaming applications, text and/or image processing applications, and any web browsing applications. Many other examples will be apparent to those skilled in the art.

Computing system 102 may be any suitable type of computing system and may have any suitable form factor. For instance, computing system 102 may be one or more personal computers, one or more servers, one or more laptops, and one or more hand-held device each of which may be a smartphone, a tablet, a slate, a personal digital assistant, a text-reader, etc. Other examples of types of computing systems are described in greater detail below with reference to FIG. 5.

Display 106 may be any suitable type of display, may be implemented any suitable technology, and may have any suitable form factor. As such display 106 may be any display configured to display text and/or images. Though, in computing environment 100, display 106 is shown as communicatively coupled to computing system 102 via wired connection 104, this is not a limitation of the present invention as display 106 may be communicatively coupled with computing system 102 in any suitable way. For example, display 106 may be external to computing system 102 and may be communicatively coupled to computing system 102 via a wireless connection. As another example, display 106 may be integrated with computing system 102 as, for example, the case may be when computing system 102 is a portable computing system such as a laptop, a tablet computer.

Computing system 102 may comprise one or more processors of any suitable type. For instance, computing system 102 may comprise one or more CPUs such as CPU 130 and one or more Graphics Processing Units (GPUs) such as GPU 110. Each of the processors may be able to read data from and write data to a memory such as memory 120. Memory 120 may be any of numerous types of memories including any memory described below with reference to FIG. 5.

GPU 110 may be any suitable type of GPU. In some embodiments, GPU 110 may support tile-based rendering of content, whereas in other-embodiments GPU 110 may not provide support for tile-based rendering of content.

In some embodiments, GPU 110 may render content by calculating one or more pixel values from the content and storing them in memory. Regardless of how the pixel values may be calculated or stored, the stored pixel values may be used by a display (e.g., display 106) to display content.

GPU 110 may store pixel values in any suitable memory. For example, GPU 110 may store pixel values in memory 120. In some instances, GPU 110 may store pixel values in a region of memory 120 such as image plane 122. Image plane 122 may be any suitable region of memory and may have any suitable size. For example, the size of image plane 122 may be such that it may store a substantial portion of pixel values calculated to render content. Pixel values stored in the image plane may be used to present the rendered content on a display, such as display 106. Though it should be recognized that pixel values may be stored in any suitable portion of memory 120 and are not limited to being stored in image plane 122. For example, pixel values may be stored in another region of memory 120 configured to store temporary pixel values or any other suitable region.

A memory region used for storing rendered content, such as image plane 122, may be organized into one or more sub-regions (or tiles). Each tile may be any suitable size. In some instances, the memory region may be tiled into one or multiple tiles of the same size such that each tile may store the same amount of data as any other tile. Though, in other instances tiles may have different sizes such that one tile may store an amount of data different from the amount of that another tile may store. As each content layer is being rendered, one tile at a time, each portion of rendered content may be stored a region of memory 120 (e.g., in image plane 122). Thus, image plane 122 may be used to store all rendered content.

To render content, GPU 110 may use on-chip memory 112. On-chip memory 112 may be a fast, low-latency memory because it may be integrated with GPU 110. For example, on-chip memory 112 may be an on-chip cache. On-chip memory 112 may have any suitable size and, for example, may be large enough to store a portion of pixel values calculated to render content.

In some embodiments, the size of on-chip memory 112 may be the same as the size of a tile used to render content. Though, in other embodiments, the size of on-chip memory 112 may not be the same as the size of a tile. For example, the size of on-chip memory 112 may be larger than the size of a tile. As a specific, example, the size of on-chip memory may be a multiple of the size of a tile used to render content (e.g., 2, 3, 4, 5, 6, etc. times the size of a tile used to render content).

Figure 2:
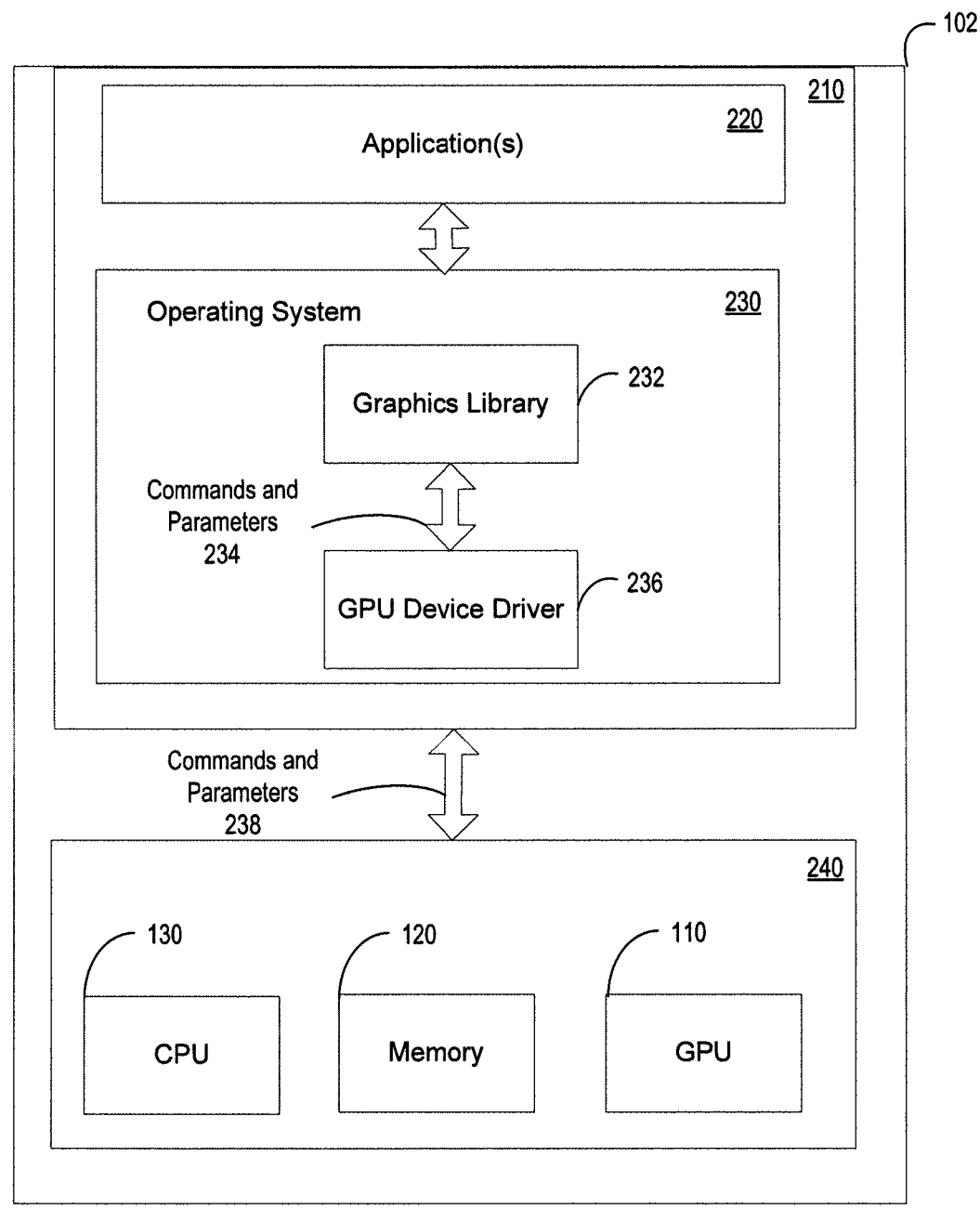
FIG. 2 is a block diagram of hardware and software components within an illustrative computing device for rendering content, in accordance with some embodiments of the present disclosure.

FIG. 2 further illustrates the architecture of computing device 102. In particular, FIG. 2 is an illustrative block diagram of hardware and software components within computing device 102.

Computing device 102 comprises hardware components 240. Hardware components 240 may include any of numerous hardware components of a physical computing device as is known in the art. For example, hardware components 240 may include GPU 110, memory 120, and CPU 130, as described with reference to FIG. 1. Though hardware components 240 are not limited by these examples and may include any other hardware components that may be needed to support rendering of content.

FIG. 2 also illustrates software components that may execute within computing device 102. In the embodiment illustrated, the software components may be stored as processor-executable instructions and configuration parameters and, for instance, may be stored in memory 120 or any other memory associated with CPU 130 and/or GPU 110.

Software components executing within computing device 102 may be any suitable software components and may comprise one or more applications 220, an operating system 230, and/or instructions that may configure a GPU to perform any of the functionality as described herein. Though it should be recognized that software components are not limited by any of the examples of software components described herein and, as such, computing device 102 may comprise any suitable software components.

Applications 220 may comprise any suitable number of applications and each application may be of any suitable type and/or have any suitable purpose. For example, an application may be any suitable application that may desire to render content or to have content rendered so that the rendered content may be displayed to one or more users. Non-limiting examples of such applications include video gaming applications, text processing applications, and content browsing applications (e.g., Internet browsing software, book reading software, photo organization software, etc.).

In some embodiments, an application may wish to render content that may comprise one or multiple content layers. Each content layer may comprise one or more primitives and, in some instances, one or primitives may appear multiple times. For example, a primitive may appear multiple times in one content layer. As another example, a primitive may appear at least once in more than one content layer. As a specific non-limiting example, a primitive such as a box or an icon may appear multiple times on a webpage.

In some embodiments, an application that wishes to render content may issue one or more commands to have the content rendered. The application may issue the command(s) in any suitable way. For example, a command may be issued by setting one or more parameters and/or by calling one or more functions. As a specific example, a command may be issued by using an application programming interface (API) such as a graphics library. Though, it should be recognized that a command may be issued in any other suitable way as known in the art.

A command issued by an application may be any suitable command and may be issued for any suitable reason. For example, an application may issue one or more commands to indicate what content may be rendered. As another example an application may issue one or more commands to indicate when that content may be rendered. As yet another example, an application may issue one or more commands to indicate the manner in which that content may be rendered. In this case, the command(s) may affect the way content layers may be rendered and, for example, may affect the order in which portions of content layers may be rendered using tile-based rendering. As a specific non-limiting example, the command(s) may provide an indication that portions of content layers corresponding to one tile may be rendered before portions of content layers associated with another tile may be rendered.

In some embodiments, an application may issue one or more commands in order to apply an effect or have an effect be applied to rendered content. The effect may be any suitable visualization effect and may be an effect such as transparency, where a first "upper" layer may be presented as partially transparent such that portions of a second "underlying" layer may appear through the first layer. The effect may also be an effect such as clipping where multiple layers may be clipped together such that portions of these layers appear together on the screen. Though, it should be appreciated that these examples are only illustrative and that any of other numerous visualization effects as known in the art may be used. Any such effect may be applied to one or more primitives in the content and/or to one or more layers in a case when the content may comprise multiple layers.

In some embodiments, an application may issue one or more commands to affect the way in which specialized hardware in computing device 102 may be used for rendering content. For instance, an application may issue one or more commands to affect the way in which a GPU may be used for rendering content and may issue one or more commands to affect the way a GPU may be used for tile-based content rendering. For example, an application may issue one or more commands to notify the GPU of an order in which certain operations associated with rendering content may be performed. In some instances, an application may notify the GPU that the GPU may employ a "tile-then-layer" approach to rendering. In other instances, the application may notify the GPU that the GPU may employ a "layer-then-tile" approach to rendering.

An application may make a determination as to which of the above-mentioned approaches to tile-based rendering may be used in any suitable way. For example, such a determination may be made dynamically based on one or more pre-programmed criteria and, for example, may be based at least in part on the content to be rendered. As a specific example, the application may determine that the GPU may employ a "tile-then-layer" approach if content to be rendered in one tile may not depend on content rendered in any other tile.

Another example of a software component executing within computing device 102 is operating system 230. Operating system 230 may be any suitable operating system and may support any of numerous applications (e.g., applications 220) written for operating system 230.

Operating system 230 may comprise one or more graphics libraries that may be used for performing operations associated with content rendering. For instance, operating system 230 may comprise graphics library 232. Graphics library 232 may include an application programming interface that may be accessed by one or more applications (e.g. applications 220) to issue one or more commands for rendering content. Non-limiting examples of such graphics libraries include the Direct2D, Direct3D, and OpenGL graphics libraries.

A graphics library, such as graphics library 232, may interface with hardware (e.g., CPU, GPU, video card, etc.) to execute any commands, issued by an application or the operating system, associated with rendering content. To this end, graphics library 232 may provide commands and/or parameters 234 to one or more device drivers to interface with the hardware.

Accordingly, operating system 230 may comprise one or more device drivers that may be used for interfacing with any suitable hardware. For instance, operating system 230 may comprise GPU device driver 236 that may be used to interface with a GPU, such as GPU 110. GPU device driver 236 may be used to interface with the GPU in any of numerous ways. For example, device driver 236 may be used to send data to the GPU, send commands to the GPU, and/or receive data from the GPU. Additionally or alternatively, operating system 230 may comprise any suitable number of drivers for interfacing with any suitable hardware part of or communicatively connected to computing device 102 (e.g., a display such as display 106 described with reference to FIG. 1).

In some embodiments, GPU device driver 236 may facilitate sending data to the GPU as part of a process for rendering content. Device driver 236 may facilitate the sending of any suitable data as part of a process for rendering content and, for example, may facilitate the sending of any data associated with content to be rendered.

In some embodiments, as part of a process for rendering content, GPU device driver 236 may send one or more commands and/or parameters 238 to GPU 110 and/or any other suitable hardware performing aspects of the rendering process. The commands (and/or parameters) may be of any suitable type and, for example, may be commands and/or parameters that configure the GPU to perform tile-based rendering. For example, commands and/or parameters 238 may configure the GPU to perform tile-based rendering using tiles of a particular size. As another example, commands and/or parameters 238 may configure the GPU to perform tile-based rendering of content, which comprises multiple layers, using one of the "layer-before-tile" approach or the "tile-before layer" approach, as previously described above.

Figure 3:
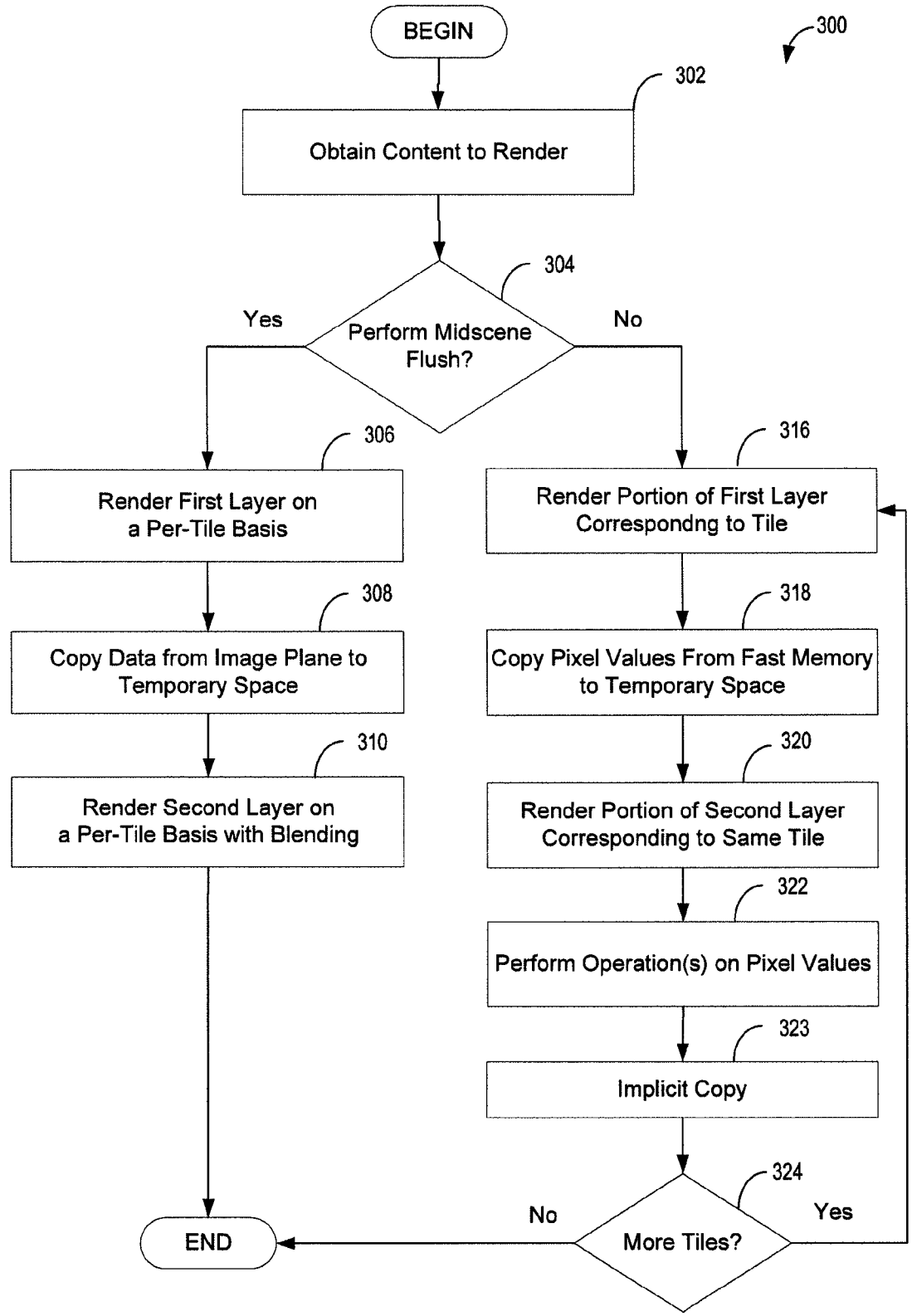
FIG. 3 is a flowchart of an illustrative process for rendering content, in accordance with some embodiments of the present disclosure.

A computing device, such as computing device 102 described with reference to FIGS. 1 and 2, may be configured to render content. One such process is described with reference to FIG. 3, which is a flowchart of illustrative process 300 for rendering content comprising at least two layers. At least a portion of the acts of process 300 may be performed by a processor such as a GPU or a CPU.

Process 300 begins in act 302, where content to be rendered may be obtained. The content may be any suitable content and, for example, may comprise one or more content layers. Each content layer may comprise any suitable type of content and may include any of the types of content previously described. In particular, each content layer may comprise one or more primitives.

The content to be rendered may be obtained in any suitable way. In some embodiments, the content to be rendered may be received from one or more software components of a computing device configured to execute process 300. For example, the content to be rendered may be received from any of the software components described with reference to FIG. 2. As a specific example, the content to be rendered may be received from a software application that may desire to render content and may have issued one or more commands to render the content.

Regardless of how content to be rendered may be obtained in act 302, process 300 proceeds to decision block 304, where it may be determined whether content may be rendered using the "layer-then-tile" approach, in which a mid-scene flush may be used, or the "tile-then-layer" approach, in which a mid-scene flush may not be used. In other words, it may be determined, in decision block 304, whether, after rendering at least a portion of the content corresponding to tile A, the content corresponding to other tiles may be rendered before at least one operation may be performed on pixel values associated with the content corresponding to tile A. As such, it may be determined, in decision block 304, whether to process commands associated with rendering in the order the commands were generated or to process them in a different order such that commands are processed in groups with each group related to rendering content corresponding to a particular tile.

This determination may be made in any suitable way. For example, the determination may be made by receiving an indication that may indicate which of the above two approaches to content rendering may be used. The indication may be any suitable type of indication and, for example, may comprise a parameter whose value may indicate which of the above approaches to content rendering may be used. Accordingly, receiving the indication may comprise receiving such a parameter. As an example, such a parameter may indicate when it is safe to avoid performing a mid-scene flush, such as when the pixel values in a composited image associated with a tile depend only on the content of corresponding tiles in the image layers combined to form the composite, whereby the tile-then-layer approach to rendering may be used. In this case, determining whether at least one operation may be performed on pixel values associated with content corresponding to tile A before content corresponding to any other tiles may be rendered may comprise receiving an indication to first perform at least one operation on the one or more pixel values.

In some embodiments, it may be determined that a "layer-then-tile" approach may be used. This may occur in any of numerous scenarios. For instance, an application may be configured to render content comprising multiple layers such that rendering one layer may require reading pixel values associated with arbitrary locations in another previously-rendered layer. In this case, rendering the one layer may require that all tiles of the other layer have been rendered. As a specific example, this situation may occur when a spatial blurring effect is applied to the content being rendered. In contrast, it may be determined that a "tile-then-layer" approach is taken when rendering a pixel of one layer may require pixel values from other layers in the same location in the layer as the pixel.

If it is determined, in decision block 304, that the "layer-then-tile" approach may be used so that a mid-scene flush may be used, process 300 proceeds to act 306, where a content layer may be rendered. A content layer may be rendered in any suitable way. For example, rendering the content layer may comprise calculating one or more pixel values from the content layer. In some cases, the calculated pixel value(s) may be stored in the image plane. In some instances, the content layer may be rendered using tile-based rendering such the content layer may be calculated on a per-tile basis so that pixel values may be calculated in groups associated with content corresponding to tiles. In this case, the content layer may be rendered by processing content corresponding to multiple tiles.

Rendering the content layer on a per-tile basis, in act 306, may comprise using a fast memory communicatively coupled to the processor (e.g., GPU or CPU). For example, rendering the content corresponding to a tile (or at least a portion of the content corresponding to the tile) may comprise using the on-chip memory 112 (FIG. 1). The fast memory may be used in any suitable way and, for example, may be used to store one or more pixel values calculated from the content-layer content corresponding to the tile.

It should be appreciated that rendering at least a portion of the content layer corresponding to utile may comprise overwriting one or more pixel values stored in on-chip memory 112 because the on-chip memory may not be large enough to store pixel values associated with the entire content layer. As a result, rendering the content layer may comprise copying pixel values associated with each tile from the fast memory to another larger, potentially slower, memory (e.g., memory 120, image plane 122, etc.) so that another tile of the same content layer may be rendered without previously-calculated pixel values being lost. Though, it should be recognized that any memory with sufficient capacity to store the one or more pixels associated with the content layer may be used. Accordingly, at the end of act 306, pixel values calculated from the first content layer may be stored in memory (e.g., memory 120, image plane 122, etc.).

Copying pixel values between the fast memory (e.g., on-chip memory 112) and a larger memory may be an operation performed automatically by the GPU and/or software controlling the GPU (e.g., GPU device driver 236), and as such may be referred to as an "implicit" copy, because applications may not need to explicitly instruct the GPU and/or software controlling to the GPU to perform it. As previously mentioned, performing multiple implicit copies between the on-chip memory and another, potentially slower, memory may lead to cache thrashing.

After the first content layer is rendered in act 308, process 300 proceeds to act 308, where data stored in the image plane may be copied. Data stored in the image plane may be any suitable data and, for example, may comprise one or more pixel values. As a specific example, the data may comprise one or more pixel values calculated, in act 306, from the first content layer and stored in the image plane. Any suitable portion of the data may be copied. In some embodiments, all data stored in the image plane may be copied, while, in other embodiments a portion of the data stored in the image plane may be copied.

The data may be copied, in act 308, for any suitable reason. In some embodiments, the data may be copied as a result of an indication (e.g., a command, a function call, a parameter, etc.) indicating that the data should be copied. In this case, the copy is referred to as an explicit copy. Such an indication may be provided from any suitable source and, for example, may be provided by a software component (e.g., any of the software components described with reference to FIG. 2) of a computing device.

Regardless of what portion of the data may be copied, the data may be copied to any suitable destination. For example, the data may be copied to any memory region that may have sufficient capacity to store a copy of the data. Such a memory region may be a region of any suitable memory. For example, the memory region may be a region of any memory communicatively coupled to a processor (e.g., CPU or GPU) such as memory 120 described with reference to FIG. 1. Accordingly, in some embodiments, the data may be copied from one region of memory 120 (e.g., image plane 122) to another region of memory 120.

In some embodiments, an explicit copy of data, such as the copy performed in act 308, may be performed to create a copy of the data for any suitable subsequent use. For example, the copied data may be used as part of a compositing operation and/or applying an effect to rendered content. As a specific example, the copied data may be used as part of a blending operation between pixel values calculated from the first content layer, in act 306, and pixel values calculated from the second content layer, in act 310, as described below. In this case, portions of the copied data may be brought into the fast memory as the second layer is being rendered.

Next, process 300 proceeds to act 310, where another layer of content may be rendered. The other layer of content may be rendered in any suitable way and, for example, may be rendered one tile at a time in a manner similar to the way that the first layer was rendered. As such, rendering the other content layer may comprise using fast memory and performing one or more implicit copy operations. It should also be appreciated that rendering the other layer may comprise overwriting one or more pixel values that may be stored in the image plane. For example, rendering the second layer may comprise overwriting the one or more pixel values calculated in act 306, while rendering the first content layer. Indeed, this possibility of overwriting stored pixel values may motivate the copying of the pixel values in act 308. As such, the copied pixel values may be retrieved and used to render the content.

In some embodiments, one or more operations may be performed on data stored in the fast memory and/or the larger memory (e.g., memory 120), as part of act 310. The operation(s) may be any suitable operation(s) and may be performed on one or more pixel values stored in the fast memory and/or the larger memory. In some embodiments, the operation(s) may involve using one or more pixels in the fast memory and/or the larger memory to calculate one or more new pixel values. In some cases, the operation(s) may involve using one or more pixels stored in the fast memory and data copied in act 306 (e.g., one more pixel values previously stored in the image plane) to calculate one or more new pixel values.

In some embodiments, operation(s) may be performed as part of applying an effect to at least a portion of the content. The effect may be any of numerous types of effects and, for example, may be an effect such as transparency, clipping, etc. As a specific example, operations may be performed to achieve a blending effect, such as a transparency or a clipping effect, by calculating one or more new pixel values from one or more pixel values calculated from the second content layer and one or more previously-calculated pixel values copied from the image plane in act 308. Though, it should be recognized that these effects are only illustrative and that operation(s) may be performed as part of applying any other suitable effect to at least a portion of the content. After the second content layer is rendered and one or more operations are performed in act 310, process 300 completes.

It should be recognized, that in acts 306-310, multiple implicit copies may be performed for each tile of content being rendered. In particular, an implicit copy may be performed for each tile of a content layer being rendered. As discussed below, in the tile-then-layer approach, the number of implicit copies may be reduced as an implicit copy may be performed one time for each tile of content.

Recall that, in decision block 304, it may also be determined that the "tile-then-layer" approach may be used as part of process 300, so that an additional layer may be rendered without using a mid-scene flush. In other words, it may be determined in decision block 304, that after rendering at least a portion of the content corresponding to tile A, at least one operation may be performed on pixel values associated with content corresponding to tile A before at least another portion of the content corresponding to a tile other than tile A may be rendered.

In this case, process 300 proceeds to act 316, where at least a portion of the first content layer corresponding to a tile may be rendered. Any suitable portion of the content layer corresponding to the tile may be rendered. The portion of the content layer corresponding to the tile may be rendered in any suitable way. For example, rendering the portion of the content layer may comprise calculating one or more pixel values from the portion of the content layer using a fast on-chip memory of a processor.

Regardless of how the portion of the first content layer may be rendered, process 300 proceeds to act 318, where data stored in the fast memory, in which the portion was rendered, may be copied. Data stored in the fast memory may be any suitable data and, for example, may comprise one or more pixel values calculated in act 316. As a specific example, the data may comprise one or more pixel values calculated as part of rendering the portion of the content layer in act 316. Any suitable portion of the data stored in the fast memory may be copied.

Regardless of what portion of the data may be copied, the data may be copied to any suitable destination. For example, the data may be copied to any memory region that may have sufficient capacity to store a copy of the data. Such a memory region may be a region of any suitable memory. For example, the memory region may be a region of any memory communicatively coupled to a processor (e.g., CPU or GPU) such as memory 120 described with reference to FIG. 1.

The data may be copied, in act 318, for any suitable reason. In some embodiments, the data may be copied as a result of an indication (e.g., a command, a function call, a parameter, etc.) indicating that the data should be copied. Such an indication may be provided from any suitable source including the sources described with reference to act 308. Thus, the copy performed in act 318 may be an explicit copy.

In some embodiments, the copy performed in act 318 may be performed to create a copy for any suitable subsequent use. For example, the copied data may be used as part of a compositing operation and/or applying an effect to rendered content. As a specific example, the copied data may be used as part of a blending operation between pixel values calculated from the first content layer, in act 316, and pixel values calculated from the second content layer, in act 320, as described below. In this case, portions of the copied data may be brought into the fast memory as the second layer is being rendered.

Next, process 300 proceeds to act 320 where at least a portion of a second content layer corresponding to the same tile may be rendered. The portion of the second layer may be rendered in any suitable way and, for example, may be rendered the same way that the portion first layer was rendered. As previously mentioned, rendering a portion of the second layer in the tile may comprise overwriting one or more pixel values that may be stored in the fast on-chip memory. For example, rendering the portion of the second layer may comprise overwriting the one or more pixel values calculated in act 316, while rendering the portion of the first content layer.

Next, process 300 proceeds to act 322, where one or more operations may be performed on the pixel values. The operation(s) may be any suitable operation(s). In some embodiments, the operation(s) may be performed on one or more pixels stored in the fast on-chip memory. In some embodiments, the operation(s) may involve using one or more pixels stored in a slower memory (e.g., memory 120) to calculate one or more new pixel values. In some cases, the operation(s) may involve using one or more pixels stored in the fast on-chip memory and data copied in act 318 (e.g., one more pixel values calculated from a portion of the first layer) to calculate one or more new pixel values. Additionally, or alternatively, the operation(s) may involve saving one or more new pixel values in the tile.

As previously mentioned, in some embodiments, one or more operations may be performed as part of applying an effect to at least a portion of the content. The effect may be any of numerous types of effects and, for example, may be an effect such as transparency, clipping, etc. As a specific example, operations may be performed to achieve a blending effect, such as a transparency or a clipping effect, by calculating one or more new pixel values from one or more pixel values stored in the fast on-chip memory and one or more pixel values copied from the fast on-chip memory in act 318.

After one or more operations are performed in act 322, process 300 proceeds to act 323 where an implicit copy may be performed so that any data stored in the fast memory (e.g., GPU on-chip memory 112) may be copied to another memory (e.g., memory 120). Next process 300 proceeds to decision block 324, where it may be determined whether there are more tiles of content that may be rendered. This determination may be made any suitable way and, for example, may be made by checking whether acts 316-323 have been performed with respect to each portion of the content. As another example, the determination may be made by checking whether acts 316-323 have been performed with respect to each tile in the image plane that may store pixel values obtained from the content as there may be cases such that not every tile in the image plane may be used to render content (e.g., content may contain content for only a portion of the screen).

If it is determined in decision block 324 that there are more tiles of content that may be rendered, process 300 loops back to act 316 and acts 316-323 may be repeated. Alternatively, if is determined in decision block 324 that that there are no more tiles of content that may be rendered, process 300 completes.

It should be recognized that process 300 is illustrative and that many variations of process 300 are possible. For example, in the illustrated embodiment, content to be rendered comprises two content layers. However, this is not a limitation of the present invention as the content may comprise any suitable number of content layers. Accordingly, process 300 may be modified to render any suitable number of content layers (e.g., at least three layers, at least four layers, etc.). This may be done in any suitable way and, for example, may be done such that, as part of process 300, portions of content corresponding to one tile from more than two content layers (e.g., three layers, four layers, etc.), may be rendered and any suitable operations (e.g., to apply a transparency or clipping effect) may be performed on one or more pixel values associated with content corresponding to that one tile, before moving on to rendering content corresponding to another tile.

As another example, in the illustrated embodiment, operations to perform compositing of layers may be performed on pixel values stored in the fast on-chip memory using pixel values copied and stored in another memory (e.g., memory 120). However, in other embodiments, such operations may be performed on pixel values stored in the other memory using pixel values from the on-chip memory. More generally, operations may be performed on pixels in any suitable memory so as to improve rendering performance and, as such, in the "tile-then-layer" approach, operations on a group of pixels associated with content corresponding to a tile may be performed in any memory and, for example, may be performed in any fast memory communicatively coupled to the GPU.

Figure 4A:
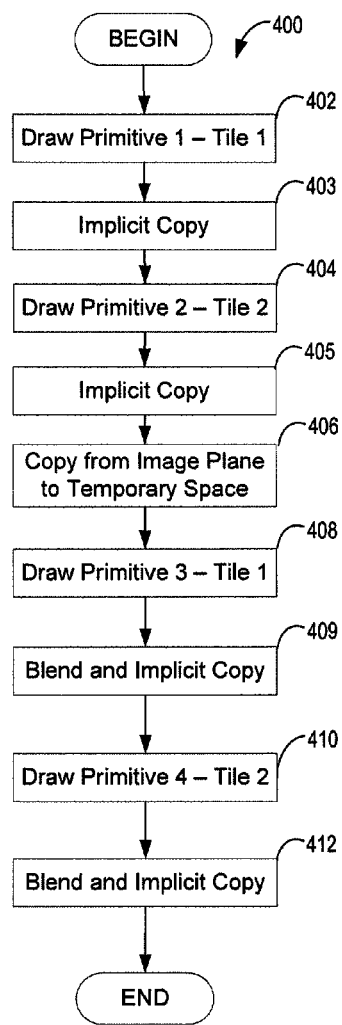
FIGS. 4a and 4b show flowcharts of illustrative processes for rendering content in accordance with some embodiments of the present disclosure.
Figure 4B:
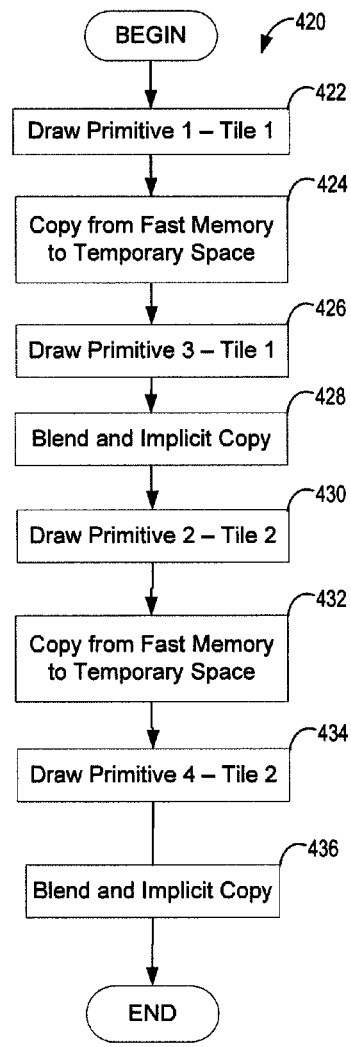

To further appreciate the differences in the two paths of process 300 (i.e., acts 306-310 and acts 316-323), FIGS. 4a-4b illustrate how content may be rendered in each case. In particular, FIG. 4a shows an illustrative process 400 that uses the "layer-then-tile" approach and employs a mid-scene flush. On the other hand, FIG. 4b shows an illustrative process 420 that uses the "tile-then-layer" approach and does not employ a mid-scene flush.

As illustrated, processes 400 and 420 are shown to render content comprising two content layers, each layer comprising two primitives, such that each content layer is rendered in two tiles. Specifically, in this non-limiting example, the first content layer and the second content layer each comprise two primitives, with each primitive corresponding to a particular tile. However, this is not a limitation of the present invention and each of these processes may be used to render content comprising any suitable number of layers, with each content layer comprising any suitable content corresponding to any suitable number of tiles. It should also be recognized that although in this example, each of the illustrated primitives correspond to a single tile, this is not a limitation of the present invention and that a primitive may correspond to any suitable number of tiles such that pixel values associated with multiple tiles may be used to render the primitive.

Process 400 begins in acts 402-405, where the first content layer may be rendered. The first content layer may be rendered in any suitable way and, for example, may be rendered using tile-based rendering. Accordingly, at least a portion of the first content layer corresponding to the first tile may be rendered, in act 402, and at least another portion of the first content layer corresponding to the second tile may be rendered, in act 404. It should be noted that an implicit copy may be performed in acts 403 and 405, following acts 402 and 404, respectively, so that pixel values computed in acts 402 and 404 may be stored. In acts 403 and 405, the pixel values may be copied from a fast memory (e.g., GPU on-chip memory 112) to an image plane (e.g., image plane 122) or any other suitable memory.

Next, process 400 proceeds to act 406, where data from the image plane (e.g., image plane 122) may be copied. The copied data may be any suitable data and may comprise pixel values calculated as part of rendering the first content layer. The data may be copied to any suitable destination and, for example, may be copied to any other region of memory that has sufficient capacity to store the copied data. The copying operation performed in act 406 may be an explicit copy operation.

Regardless of how the data may be copied or the destination to which it may be copied, process 400 proceeds to acts 408-412 where the second content layer may be rendered. The second layer may be rendered in any suitable way and, for example, may be rendered using tile-based rendering. Accordingly, at least a portion of the second content layer corresponding to the first tile may be rendered in act 408.

Next in act 409, one or more operations may be performed on pixels associated with content corresponding to the first tile. For instance, one or more operations may be performed to apply a blending effect in act 409. Such operations may comprise calculating new pixel values from pixel values calculated from the portion of the first content layer corresponding to tile 1 (in act 402) and pixel values calculated from the portion of the second content layer corresponding to tile 1 (in act 408). After one or more operations are performed, an implicit copy may be performed as part of act 409 such that any pixel values computed in acts 408-409 may be stored.

After acts 408-409, at least another portion of the second content layer corresponding to the second tile may be rendered, in act 410. Next in act 412, one or more operations may be performed on pixels associated with content corresponding to the second tile. For instance, one or more operations may be performed to apply a blending effect. Such operations may comprise calculating new pixel values from pixel values calculated from the portion of the first content layer corresponding to tile 2 (in act 404) and pixel values calculated from the portion of the second content layer corresponding to tile 2 (in act 410). After one or more operations are performed, an implicit copy may be performed as part of act 412 such that any pixel values computed in acts 410-412 may be stored.

It should also be appreciated that, in process 400, no operations are performed on pixel values associated with content corresponding to tile 1, until after act 404 in which at least another portion of the first content layer corresponding to tile 2 is rendered. As a result process 400 may be said to perform a mid-scene flush: all tiles of the first content layer are executed before any operations on already-calculated pixel values are performed.

In contrast, no mid-scene flush is performed in process 420. Process 420 begins in act 422, where at least a portion of the first content layer corresponding to the first tile may be rendered. Next, process 420 proceeds to act 424 where data stored in the first tile may be copied. As described with respect to act 318 of process 300, the data may be any suitable data and may comprise pixel values calculated as part of rendering at least a portion of the first content layer. The data may be copied from a fast memory (e.g., on-chip memory 112) to an image plane (e.g., image plane 122) or any other suitable memory.

Regardless of how the data may be copied or the destination to which it may be copied, process 420 proceeds to act 426 where at least another portion of the first content layer corresponding to the first tile may be rendered.

Next, process 420 proceeds to act 428, where one or more operations may be performed on pixel values associated with content corresponding to the first tile. As previously described such operations may be performed for any suitable purpose and, for example, may be performed to apply a blending effect. In this case, new pixel values may be calculated from pixel values that were copied in act 424 and the pixel values calculated in act 426. After one or more operations are performed, an implicit copy may be performed as part of act 428 such that any pixel values computed in acts 426-428 may be stored.

After act 428, process 420 proceeds to acts 430-436, where portions of both the first and the second layer may be rendered in the second tile in a manner analogous to how portions of the first and second layers were rendered in the first tile, during acts 422-428. Process 420 completes after act 436.

It should be appreciated that, in process 420, no portion of the content is rendered in the second tile, until after one or more operations are performed on pixel values stored in the first tile. In particular, portions of both content layers are rendered in the first tile before any content is rendered in the second tile. As a result, there may be less cache thrashing in process 420 relative to process 400. As can be seen, only two implicit copies are performed (acts 428 and 436) in process 420, whereas four implicit copies are performed in process 400 (acts 403, 405, 409, and 412).

Figure 5:
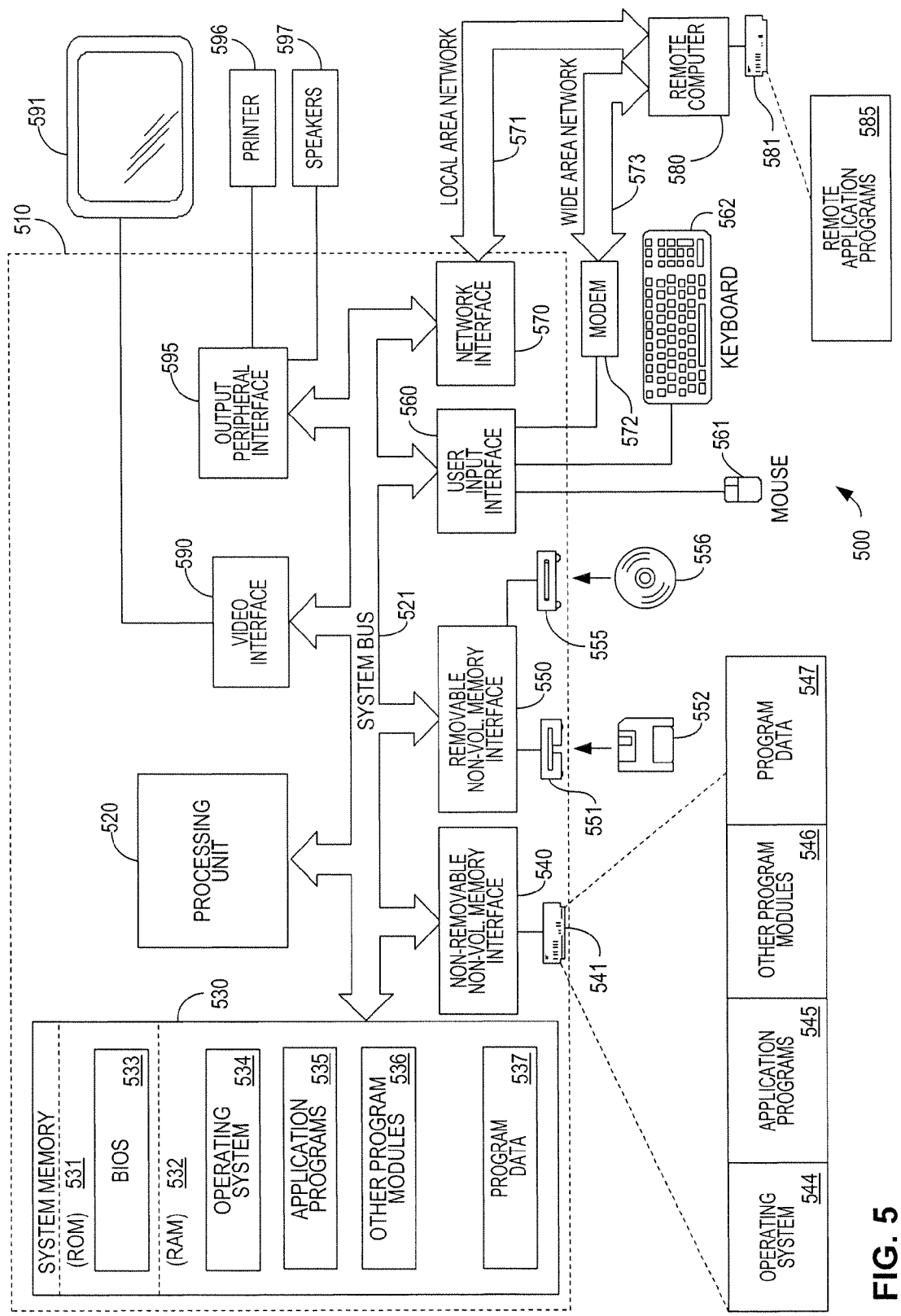
FIG. 5 is a block diagram generally illustrating an example of a computing device that may be used in implementing aspects of the present disclosure.

FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet. When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one computer-readable storage medium storing an application comprising processor-executable instructions that, when executed by at least one processor, perform operations, the operations comprising:
    configuring a graphics processing unit (GPU) of a computing device, including:
        determining whether the GPU is to render graphics using a tile-then-layer approach or a layer-then-tile approach based at least in part on whether graphics for a tile depends on content from any other tile, wherein:
            the graphics is organized as a plurality of tiles each having a plurality of layers of content;
            the tile-then-layer approach includes rendering the graphics tile-by-tile; and
            the layer-then-tile approach includes rendering the graphics layer-by-layer; and
        if it is determined that the the GPU is to render the graphics using the tile-then-layer approach:
            notifying the GPU that the GPU is to render the graphics tile-by-tile.

2. The at least one computer-readable storage medium of claim 1, wherein if it is determined that the GPU is to render the graphics using the layer-then-tile approach, the operations further comprises:
    notifying the GPU that the GPU is to render the graphics layer-by-layer.

3. The at least one computer-readable storage medium of claim 1, wherein the notifying comprises:
setting a parameter and/or calling a function to indicate whether the GPU is to render the graphics tile-by-tile or layer-by-layer.

4. The at least one computer-readable storage medium of claim 1, wherein the application further comprises processor-executable instructions that, when executed by the at least one processor, cause the at least one processor to render content of a webpage and/or content of a video game.

5. The at least one computer-readable storage medium of claim 1, wherein rendering the graphics layer-by-layer includes applying a transparency and/or a clipping effect to the at least a portion of the graphics.

6. A system for rendering content comprising a plurality of content layers, wherein the content is organized as a plurality of tiles including a first tile and a second tile, the system comprising a graphics processing unit (GPU) having rendering hardware and a GPU memory, wherein the GPU that is configured to:
render at least a first portion of the content corresponding to the first tile to produce one or more pixel values;
receive an indication of whether the content is to be rendered tile-then-layer or layer-then-tile by the GPU based at least in part on potential dependency of output for one tile on content for another tile, wherein:
tile-then-layer rendering includes at least one operation for compositing values for portions for at least two layers associated with a first tile before rendering a second portion of the content corresponding to the second tile; and
if the indication indicates that the content is to be rendered tile-then-layer:
compositing values for the portions of the at least two layers associated with the first tile before rendering the second portion of the content corresponding to the second tile.

7. The system of claim 6, wherein at least the first portion of the content comprises a first content layer and a second content layer, the one or more pixel values comprise a first set of pixel values and a second set of pixel values, and the GPU is further configured to render the at least the first portion of the content corresponding to the first tile by:
rendering at least a portion of the first content layer corresponding to the first tile to calculate the first set pixel values;
in response to rendering at least the portion of the first content layer, copying the first set of pixel values to a region of a memory; and
in response to the copying, rendering at least a portion of the second content layer corresponding to the first tile to calculate the second set of pixel values.

8. The system of claim 7, further comprising:
a memory that is communicatively coupled to the GPU, wherein the memory is not onboard the GPU.

9. The system of claim 7, wherein performing the at least one operation on the one or more pixel values comprises:
using at least one of the first set of pixel values or the second set of pixel values to obtain one or more new pixel values.

10. The system of claim 6, wherein receiving the indication comprises:
receiving an indication through an interface to a graphics processing routine.

11. The system of claim 10, wherein the indication comprises a parameter whose value indicates to first perform at least one operation on the one or more pixel values.

12. A computing device for configuring a graphics processing unit (GPU), the computing device comprising:
a memory and a processor that respectively store and execute instructions, including instructions that:
determine a sequence in which the GPU is to render tiles and layers of a graphical image with respect to each other based at least in part on whether content for individual tiles is renderable independent of content for other tiles, wherein the graphical image is to be presented on a display associated with the computing device; and
configure the GPU according to the determined sequence.

13. The computing device of claim 12, wherein the instructions also perform at least one operation that applies a transparency and/or a clipping effect to at least a portion of the graphical image corresponding to a first tile.

14. The computing device of claim 13, wherein the GPU is configured to complete the at least one operation for one or more pixel values corresponding to the first tile before performing any rendering of the second tile.

15. The computing device of claim 12, further comprising: the GPU, wherein the GPU:
is to be configured by the processor; and
renders the graphical image.

16. The computing device of claim 15, wherein:
a first tile comprises a first portion of a first content layer and a first portion of a second content layer;
a second tile comprises a second portion of the first content layer and a second portion of the second content layer; and
the GPU also:
calculates a first set of pixel values associated with at least the first portion of the first content layer;
produces the second set of pixel values for the at least the first portion of the second content layer; and
renders the first tile based on the first set of pixel values and the second set of pixel values.

17. A method of rendering graphics for display on a display device associated with a computing device, comprising:
receiving, by the computing device, content that is to be rendered for display on the display device associated with the computing device;
selecting, by the computing device, whether the received content is to be rendered by a graphics processing unit (GPU) of the computing device through a tile-then-layer process or through a layer-then-tile process based at least in part on whether output for a tile is independent of data for another tile; and
rendering, by the GPU of the computing device, the received content for display on the display device associated with the computing device according to the selected process.

18. The method of claim 17, further comprising:
displaying the rendered content on the display device that is associated with the computing device.

19. The method of claim 17, wherein the received content includes a plurality of content layers and is organized as a plurality of tiles.

20. The method of claim 17, wherein selecting whether the received content is to be rendered through the tile-then-layer process or through the layer-then-tile process is also based, at least in part, on whether a midscene flush would be conducted if the content were rendered via the layer-then-tile process.

21. The method of claim 17, wherein selecting whether the received content is to be rendered through the tile-then-layer process or through the layer-then-tile process is also based, at least in part, on a size of a memory coupled to the GPU of the computing device.

22. The method of claim 17, wherein rendering the received content according to the selected process includes:
applying a transparency effect and/or a clipping effect to a portion of the received content.

23. The method of claim 17, wherein rendering the received content according to the selected process includes:
compositing pixel values for at least two layers of a tile before rendering content corresponding to any other tile.

24. The method of claim 17, wherein rendering the received content according to the selected process includes:
performing at least one implicit copy operation.

25. The method of claim 17, wherein:
selecting whether the received content is to be rendered through the tile-then-layer process or through the layer-then-tile process results in a selection that the received content is to be rendered through the tile-then-layer process; and
the tile-then-layer process includes at least one implicit copy operation.

* * * * *